Patented Nov. 7, 1922.

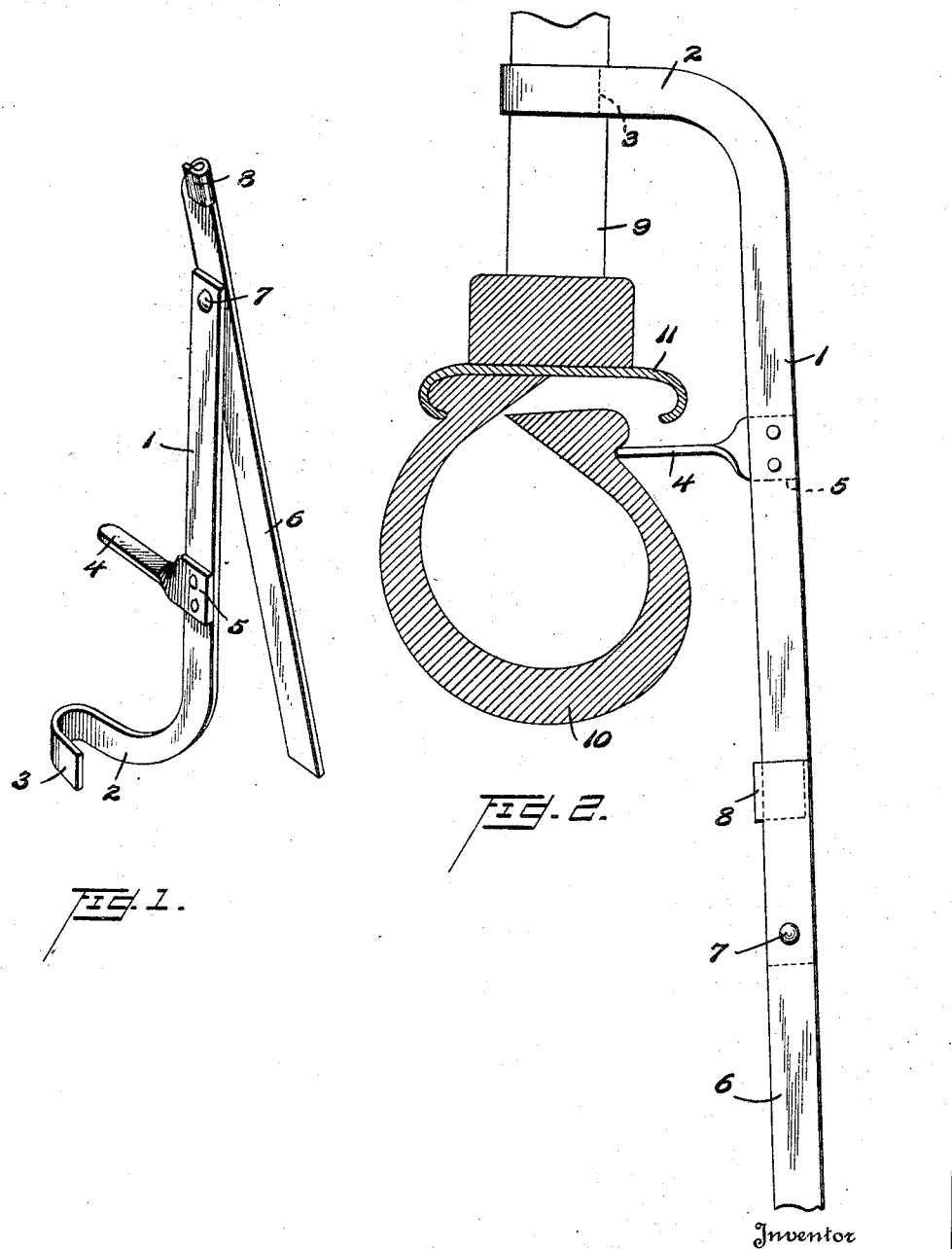

1,434,648

UNITED STATES PATENT OFFICE.

JOHN P. COLGAN, OF WAYCROSS, GEORGIA, ASSIGNOR OF ONE-FOURTH TO JOHN N. STINSON AND ONE-FOURTH TO JAMES D. BLALOCK, BOTH OF WAYCROSS, GEORGIA.

TIRE TOOL.

Application filed February 7, 1920. Serial No. 357,031.

*To all whom it may concern:*

Be it known that I, JOHN P. COLGAN, a citizen of the United States, and residing at Waycross, in the county of Ware, State of Georgia, have invented certain new and useful Improvements in Tire Tools, of which the following is a specification.

This invention relates to a new and useful tire tool and has for its object the provision of a simple tool of that character which can be used to force the tire of a vehicle from its seat in the rim.

In former devices of this character it has been customary to arrange the parts so that in use the handle member of the tool projects toward the hub of the wheel with the result that considerable difficulty and inconvenience are experienced particularly when it is desired to operate upon the inner side of the wheel, since in such operation the parts of the automobile interfere with the free use of the tool and the operator is compelled to get under the automobile or assume a stooping or other difficult position.

In the device of the present invention the parts of the tool are so arranged that it can be employed with equal facility to exert pressure upon either side of the tire, this result being accomplished by arranging the spoke-engaging member and the tire-engaging member in such relation that when in operative position on a wheel the handle portion of the tool projects beyond the tire and within easy grasp of the operator. By this device, therefore, the objectionable features above pointed out are obviated.

A further object of the invention is to provide a tool of the kind in question in which the spoke-engaging member and the tire-engaging member are rigidly secured together, which results in a simple and inexpensive device that is durable and easy to manufacture.

With the above and other objects in view the invention consists of the novel details of construction illustrated in the accompanying drawings and embraced in the appended claims.

In the drawings:—

Figure 1 is a perspective view of the device in question.

Fig. 2 is an elevation of the device illustrated in operative position in connection with part of a wheel of an automobile, portions of the latter being shown in section.

Referring in detail to the drawing, the numeral 1 represents a lever member which is curved at one end as shown at 2 and provided with a hooked portion 3 which is adapted to engage the spoke of a wheel. The tire-engaging member 4 is rigidly secured to the lever member 1 by any suitable means as rivets 5, said tire-engaging member projecting laterally from the lever member and in the plane of the curved portion 2 of the latter. The lever member 1 constitutes a handle for use in manipulating the tool, and if desired said lever member may be provided with an extension 6 suitably pivoted as at 7 to said lever member, the extension being provided with a hook 8 for engaging the lever member when the part 6 is used as a handle.

In the operation of removing a tire with the device of the present invention, the hooked portion 3 of the lever member 1 is engaged with a spoke of the wheel as shown at 9 in Fig. 2. The tire-engaging member 4 is then brought into contact with the edge of the tire designated as 10, and upon applying pressure to the handle of the device the edge of the tire is forced from its seat in the rim 11. After the tire has been disengaged from the rim on one side of the wheel it can be held in such disengaged position by any suitable means (not shown) inserted between the edge of the tire and the rim, and the tool can then be applied to the opposite side of the wheel so as to complete the disengagement of the tire from the rim.

It is evident that with the device of the present invention, the operation of removing the tire may be performed without difficulty and that the use of the device will not be interfered with on account of the same coming in contact with parts of the automobile.

It will be noted that the lever member 1 is composed of a single strip of metal of substantially uniform thickness and width curved in the plane of the side at one end to approximately right angles with the extreme end curved laterally and back towards the main body of the lever member, forming a hook, and that the tire engaging member is also formed from a strip of metal secured at one end to the side of the lever member and so twisted that its side at the outer end will be at right angles to the side of the lever member. The supplemental lever member 6 is composed of a strip similar to that of lever 1 and is straight, but has the hook 8 formed at one side of one margin at one end and this hook engages over the other lever member when turned to the position shown in Figure 2.

What I claim as my invention and desire to secure by Letters Patent is:

1. A tool for removing tires from wheels comprising a lever member in the form of a flat metal strip of substantially uniform width and thickness straight from one end to a point near the other end and there curved in the planes of its sides to a position at substantially right angles with its extreme end curved or curled laterally forming a hook on one side of the plane of said lever member facing towards the lines of the lever member, a tire engaging member in the form of a flat metal strip fitting at one end against the sides of said lever member and secured thereto near said curved end projecting therefrom on the same side as said curved end and so twisted that its side surfaces at its outer end will be at substantially right angles to the side surfaces of said lever member.

2. A tool for removing tires from wheels comprising a lever member in the form of a flat metal strip of substantially uniform width and thickness straight from one end to a point near the other end and there curved in the planes of its sides to a position at substantially right angles with its extreme end curved or curled laterally forming a hook on one side of the plane of said lever member facing towards the lines of the lever member, a tire engaging member in the form of a flat metal strip fitting at one end against the side of said lever member and secured thereto near said curved end projecting therefrom on the same side as said curved end and so twisted that its side surfaces at its outer end will be at substantially right angles to the side surfaces of said lever member, a supplemental lever member composed of a flat metal strip similar to that of the main member straight from one end to approximately the other end with a laterally curved hook extending from one margin at one end back across and near the side, and means pivotally connecting said supplemental lever near its hooked end to the end of said first mentioned lever member, the said supplemental lever member closely fitting along that side surface of the first mentioned lever member opposite to that to which the tire member is secured and from which the hooked end projects and the hook on the end of the supplemental lever member projecting from the side next to the first mentioned lever member.

In testimony whereof I affix my signature.

JOHN P. COLGAN.